(12) United States Patent
Ryu et al.

(10) Patent No.: US 8,320,915 B2
(45) Date of Patent: Nov. 27, 2012

(54) METHOD AND APPARATUS FOR PERFORMING CELL RESELECTION IN WIRELESS COMMUNICATION SYSTEM

(75) Inventors: Jin Sook Ryu, Anyang-si (KR); Dong Keun Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/038,735

(22) Filed: Mar. 2, 2011

(65) Prior Publication Data
US 2011/0250888 A1 Oct. 13, 2011

Related U.S. Application Data

(60) Provisional application No. 61/323,849, filed on Apr. 13, 2010, provisional application No. 61/330,889, filed on May 4, 2010, provisional application No. 61/334,156, filed on May 12, 2010, provisional application No. 61/346,036, filed on May 19, 2010.

(30) Foreign Application Priority Data

Nov. 30, 2010 (KR) .................. 10-2010-0120258

(51) Int. Cl.
*H04W 4/00* (2009.01)
*H04M 1/66* (2006.01)

(52) U.S. Cl. .................................... 455/435.3; 455/411
(58) Field of Classification Search .................. 455/423, 455/525, 411, 436, 435.1, 435.3, 437, 453, 455/435.2, 452.1, 450, 444, 439, 449; 370/230, 370/236.2, 329, 252, 328
See application file for complete search history.

(56) References Cited

U.S. PATENT DOCUMENTS

| | | | |
|---|---|---|---|
| 2007/0004445 A1* | 1/2007 | Dorsey et al. | 455/525 |
| 2009/0318116 A1* | 12/2009 | Kim | 455/411 |
| 2010/0113010 A1* | 5/2010 | Tenny et al. | 455/423 |

* cited by examiner

*Primary Examiner* — Kiet Doan
(74) *Attorney, Agent, or Firm* — Morgan, Lewis & Bockius LLP

(57) ABSTRACT

An apparatus and method of performing cell reselection in a wireless communication system is provided. A mobile station determines whether first priority information for the first RAT is provided by the serving cell, and receives second priority information of a second RAT from the serving cell. The mobile station performs inter-RAT cell reselection based on the first and second priority information if the first priority information for the first RAT is provided. The mobile station performs cell reselection toward the second RAT based on measured values of cells of the second RAT without considering the second priority information if the first priority information for the first RAT is not provided.

8 Claims, 5 Drawing Sheets

METHOD AND APPARATUS FOR PERFORMING CELL RESELECTION IN WIRELESS COMMUNICATION SYSTEM

CROSS-REFERENCE TO RELATED APPLICATIONS

This application claims the benefit of priority of U.S. Provisional applications 61/323,849 filed on Apr. 13, 2010, 61/330,889 filed on May 4, 2010, 61/334,156 filed on May 12, 2010, 61/346,036 filed on May 19, 2010, and Korean Patent Application No. 10-2010-0120258 filed on Nov. 30, 2010, all of which are incorporated by reference in their entirety herein.

BACKGROUND OF THE INVENTION

1. Field of the Invention

The present invention relates to wireless communications, and more particularly, to a method and apparatus for performing cell reselection in a wireless communication system.

2. Related Art

A global system for mobile communication (GSM) is a radio technology which has been developed as a system for standardizing radio communication systems in Europe. A general packet radio service (GPRS) is a technique introduced to provide a packet switched data service in a circuit switched data service provided from the GSM. A universal mobile telecommunication system (UMTS) is a wireless communication system based on wideband code division multiple access (WCDMA). E-UTRAN is a wireless communication system based on orthogonal frequency division multiple access (OFDMA).

To overcome a restriction of a service area and a limitation of a user capacity, the wireless communication system provides a communication service by dividing the service area into a plurality of cells. This is referred to as a multi-cell environment.

Cell selection is a process in which a mobile station (MS) selects a cell to receive a service. The purpose of the cell selection is to register the MS to a network in order to receive the service from a base station (BS). In general, the MS selects a cell having a strongest signal property value by performing a signal measurement process with respect to the BS in all searchable frequency bands. The cell selected by the MS is referred to as a serving cell. A cell neighboring to the serving cell is referred to as a neighbor cell.

As the MS moves, it may be inappropriate to receive the service from the serving cell. In this case, the MS reselects a suitable cell capable of maintaining service quality and receiving a signal with better quality. This is referred to as cell reselection.

The cell reselection is a process of selecting a more suitable cell based on criteria for cell reselection and signal measurement in an idle state or a packet transfer mode. In the idle state, the MS repeats a process of reselecting a cell having a better signal property by measuring signals in the serving cell and the neighbor cell. For the MS with mobility, the cell reselection is important in order to receive a service with better quality.

Heterogeneous networks using various types of radio access technology (RAT) are introduced. The RAT is a type of technology used for radio access. Examples of the RAT include GSM/EDGE radio access network (GERAN), a UMTS terrestrial radio access network (UTRAN), an evolved-UMTS terrestrial radio access network (E-UTRAN), and so on. The GERAN, the UTRAN, and/or the E-UTRAN coexist in the same area. The E-UTRAN is also called long term evolution (LTE).

Hereinafter, a GSM cell (or a GERAN cell) is a cell using the GSM/GPRS (or GERAN) as the RAT. A UTRAN cell is a cell using the UTRAN as the RAT. An E-UTRAN cell is a cell using the E-UTRAN as the RAT.

The introduction of various types of RATs results in a problem of the interoperation between RATs. For the interoperation between different RATs, the MS may support multi-RAT. The MS supporting the multi-RAT may reselect a cell having another RAT different from the RAT of the serving cell. This is called inter-RAT cell reselection. For example, if the serving cell is a GSM cell, the MS may reselect a neighbor UTRAN cell or E-UTRAN cell.

For inter-RAT cell reselection, priority-based inter-RAT cell reselection is disclosed in the section 6.6.6 of 3GPP TS 45.008 V9.1.0 (2009-11) "Technical Specification Group GSM/EDGE Radio Access Network; Radio subsystem link control (Release 9)". The MS attempts to camp on a cell having a frequency of an RAT having a top priority.

Accordingly, there is a need for a method capable of effectively performing a cell reselection process by an MS in heterogeneous networks in which various types of RATs coexist.

SUMMARY OF THE INVENTION

The present invention provides a method and apparatus for performing cell reselection in a wireless communication system.

In an aspect, a method of performing cell reselection by a mobile station which camps on a serving cell of a first radio access technology (RAT) in a wireless communication system is provided. The method includes determining whether first priority information for the first RAT is provided by the serving cell, receiving, from the serving cell, second priority information of a second RAT, if the first priority information for the first RAT is provided, performing inter-RAT cell reselection based on the first and second priority information, and if the first priority information for the first RAT is not provided, performing cell reselection toward the second RAT based on measured values of cells of the second RAT without considering the second priority information.

The step of performing cell reselection toward the second RAT based on measured values of cells of the second RAT may include determining at least one suitable cell used for reselection from the first RAT to the second RAT, wherein a measured value of each of the at least one suitable cell of the second RAT exceeds a measured value of the serving cell by an offset during an interval, and reselecting a cell with the greatest measured value among the at least one suitable cell of the second RAT.

The measured value of each of the at least one suitable cell of the second RAT may include a measured received signal code power (RSCP) value of the at least one suitable cell of the second RAT, and the measured value of the serving cell includes a received level averages of the serving cell.

The first RAT may include GSM EDGE Radio Access Network (GERAN) and the second RAT may include UMTS Terrestrial Radio Access Network (UTRAN).

The first priority information may include a priority and a threshold of the first RAT used for inter-RAT cell reselection, and the second priority information may include a priority and thresholds of the second RAT used for inter-RAT cell reselection.

If the first priority information for the first RAT is provided, the second priority information may include the first priority information.

In an aspect, a mobile station of performing cell reselection in a wireless communication system, wherein the mobile station camps on a serving cell of a first radio access technology (RAT) is provided. The apparatus includes a radio frequency unit for transmitting and receiving radio signals, and a processor operatively coupled with the radio frequency unit and configured for determining whether first priority information for the first RAT is provided by the serving cell, receiving, from the serving cell, second priority information of a second RAT, if the first priority information for the first RAT is provided, performing inter-RAT cell reselection based on the first and second priority information, and if the first priority information for the first RAT is not provided, performing cell reselection toward the second RAT based on measured values of cells of the second RAT without considering the second priority information.

Cell reselection can be achieved such that a cell having better quality is selected even if priority information of a serving cell is not provided. Deterioration of service quality can be decreased.

DESCRIPTION OF EXEMPLARY EMBODIMENTS

Figure 1:
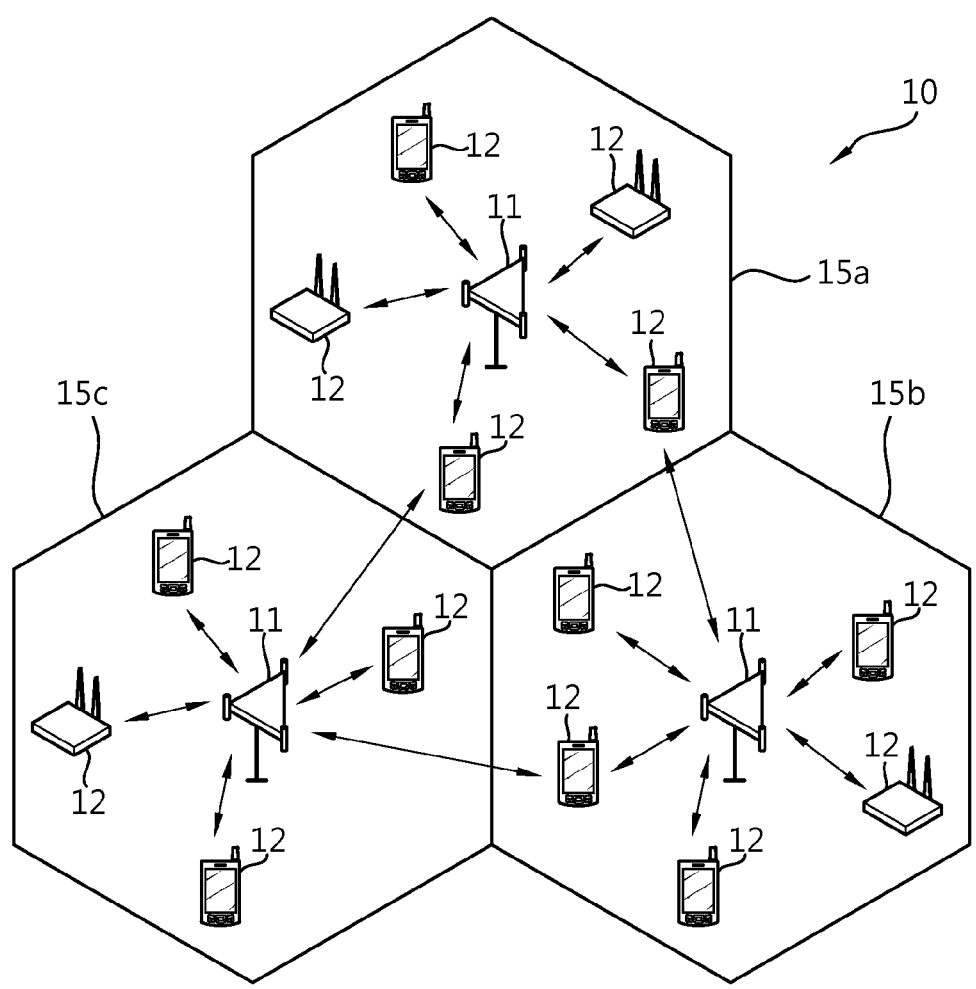
FIG. 1 shows a wireless communication system.

FIG. 1 shows a wireless communication system. A wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors).

A mobile station (MS) 12 may be fixed or mobile, and may be referred to as another terminology, such as a user equipment (UE), a mobile terminal (MT), a user terminal (UT), a subscriber station (SS), a wireless device, a personal digital assistant (PDA), a wireless modem, a handheld device, etc.

The BS 11 is generally a fixed station that communicates with the MS 12 and may be referred to as another terminology, such as an evolved node-B (eNB), a base transceiver system (BTS), an access point, etc.

Downlink (DL) denotes communication from the BS to the MS, and uplink (UL) denotes communication from the MS to the BS. In the DL, a transmitter may be a part of the BS, and a receiver may be a part of the MS. In the UL, the transmitter may be a part of the MS, and the receiver may be a part of the BS.

Hereinafter, a serving cell is a cell in which the MS is currently receiving a service, and a radio access technology (RAT) of the serving cell is called a GSM/EDGE radio access network (GERAN). Inter-RAT cell reselection is cell reselection from the GERAN to a UMTS terrestrial radio access network (UTRAN) or an evolved-UMTS terrestrial radio access network (E-UTRAN).

A packet idle mode implies that a temporary block flow (TBF) is not provided. A packet transfer mode implies that at least one TBF is provided by allocating a radio resource to the MS. The TBF is a logical connection offered by two medium access control (MAC) entities so as to support the unidirectional transfer of a radio link control (RLC) protocol data unit (PDU) on basic physical subchannels. At least one TBF is provided in a packet transfer mode. A temporary flow identity (TFI) is assigned to each TBF by the network. The MS assumes that the TFI value is unique among concurrent TBFs in the same direction (uplink or downlink) on all packet data channels (PDCHs) used for the TBFs.

Now, priority-based inter-RAT cell reselection will be described by referring to the section 6.6.6 of 3GPP TS 45.008 V9.1.0 (2009-11).

Figure 2:
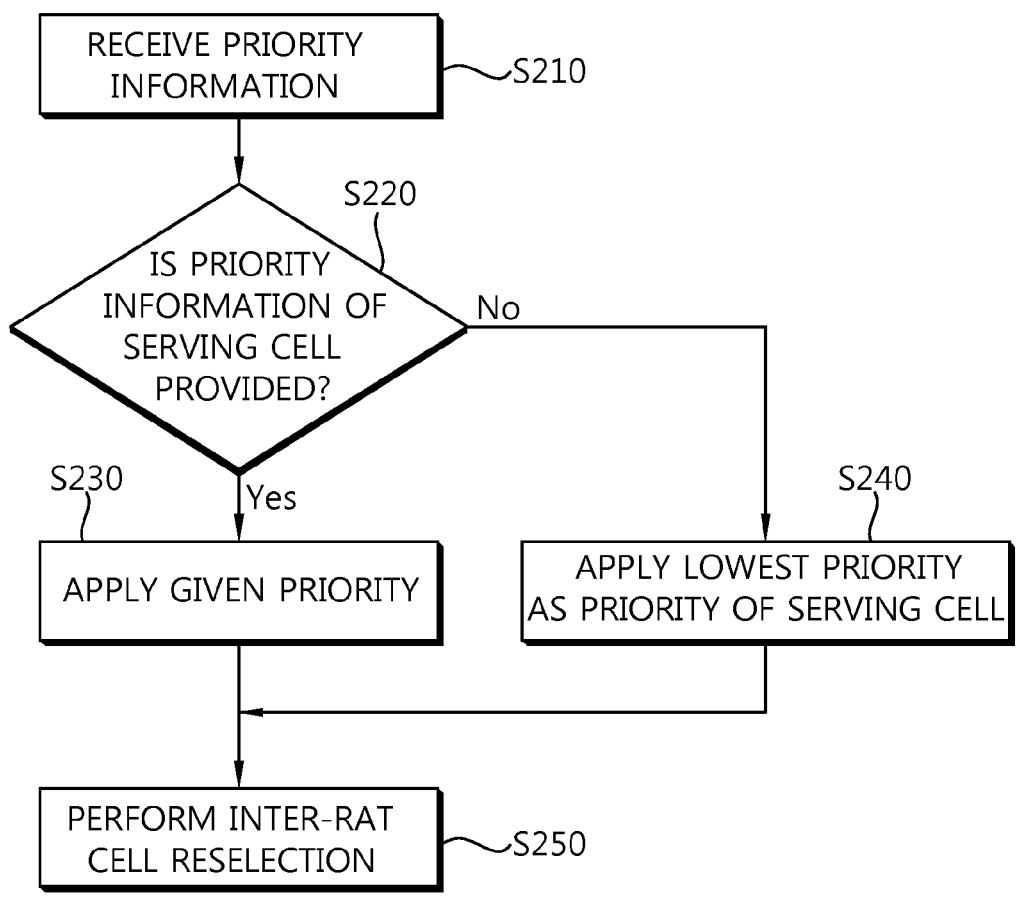
FIG. 2 is a flowchart showing conventional inter-RAT cell reselection.

FIG. 2 is a flowchart showing conventional inter-RAT cell reselection.

An MS receives RAT priority information from a network (step S210). The RAT priority information may be broadcast through an SI2 quater message or a packet measurement order message.

The RAT priority information includes a priority of a different RAT and a threshold for inter-RAT cell reselection (e.g., UTRAN_PRIORITY, E-UTRAN_PRIORITY, THRESH_UTRAN_high, and THRESH_E-UTRAN_high).

The MS determines whether priority information of a serving cell is provided (step S220). The priority information of the serving cell includes a priority GEREAN_PRIORITY and a threshold THRESH_GSM_low of the serving cell.

When a BS does not send the priority information of the serving cell to the MS, the MS may not be able to receive the priority information of the serving cell. Alternatively, when a message for carrying the priority information of the serving cell is lost or when an error occurs in decoding, the MS may not be able to receive the priority information of the serving cell.

When the priority information of the serving cell is provided, the MS applies a priority given to the serving cell (step S230). If the priority information of the serving cell is not provided, the MS applies a lowest priority to the serving cell (step S240).

On the basis of the priority information, the MS performs inter-RAT cell reselection (step S250).

More specifically, cell reselection is performed toward a cell of a different inter-RAT frequency when one of the following criteria is satisfied. S_GSM is a measured value of a GSM cell which is a serving cell. S_non-serving_XXX is a measured value of a non-serving inter-RAT cell for an RAT 'XXX'.

First, S_non-serving_XXX of one or more cells having a higher priority is greater than THRESH_XXX_high during a reselection interval (i.e. Treselection). The MS considers a cell for reselection in a descending order of priority. As to cells of RATs having the same priority, the MS considers a cell for reselection in a descending order of S_non-serving_XXX. The MS reselects a first cell satisfying the criterion.

Second, S_GSM is lower than THRESH_GSM_low of the serving cell and all measured GSM cells during the Treselection. The MS considers inter-RAT reselection in the order described below, and reselects the first cell satisfying the following criteria.

(1) S_non-serving_XXX of one or more cells having a lower priority is greater than THRESH_XXX_low during the Treselection. The MS considers a cell for reselection in a descending order of priority. As to cells of RATs having the same priority, the MS considers a cell for reselection in a descending order of S_non-serving_XXX.

(2) If no cell satisfies the above criterion (1), an inter-RAT cell of which S_non-serving_XXX is greater than S_GSM by hysteresis H_PRIO is considered.

As described above, according to 3GPP TS 45.008 V9.1.0 (2009-11), when the MS fails to obtain the priority information of the serving cell, cell reselection is performed by assigning a lowest priority to the GSM cell.

However, the following problems are expected in the above operation.

First, since the GSM cell has a lowest priority, the MS needs to periodically monitor the different RAT while receiving a service from the serving cell which is the GSM cell. Since cells of the different RAT are continuously measured irrespective of signal quality of the serving GSM cell on which the MS camps, power consumption increases. In addition, in a packet transfer mode, deterioration of packet service quality is expected due to monitoring of the different RAT.

Second, if signal quality of neighbor UTRAN cells or E-UTRAN cells is greater than THRESH_XXX_high, the MS reselects a cell of the different RAT irrespective of the signal quality of the serving cell. In this case, if it is assumed that a top priority is given to the newly selected cell of the different RAT, the MS shall reselect the GSM cell. Accordingly, a ping-pong problem may arise in which an MS located equidistantly from the two cells continuously moves back and forth between the GSM cell and the different RAT cell.

Figure 3:
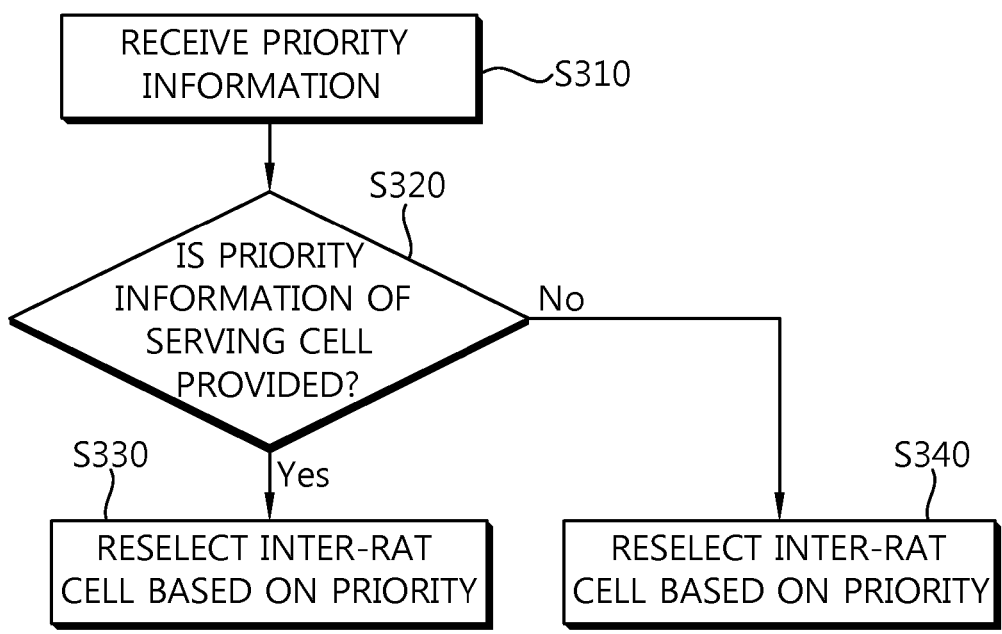
FIG. 3 is a flowchart showing a cell reselection method according to an embodiment of the present invention.

FIG. 3 is a flowchart showing a cell reselection method according to an embodiment of the present invention.

An MS receives priority information on a different RAT (referred to as second priority information) from a GSM cell which is a serving cell (step S310). The second priority information may include a priority of the different RAT and a threshold for inter-RAT cell reselection (e.g., UTRAN_PRIORITY, E-UTRAN_PRIORITY, THRESH_UTRAN_high, and THRESH_E-UTRAN_high).

The MS determines whether priority information of the serving cell (referred to as first priority information) is provided from the serving cell (step S320). The first priority information includes a priority GEREAN_PRIORITY and a threshold THRESH_GSM_low of the serving cell. The second priority information may be included in the first priority information, or may be transmitted by a network to the MS through an additional message.

If the first priority information is provided, the MS performs inter-RAT cell reselection based on the first and second priority information (step S330). More specifically, cell reselection is performed toward a cell of a different inter-RAT frequency when one of the following criteria is satisfied. S_GSM is a measured value of a GSM cell which is a serving cell. S_non-serving_XXX is a measured value of a non-serving inter-RAT cell for an RAT 'XXX'.

First, S_non-serving_XXX of one or more cells having a higher priority is greater than THRESH_XXX_high during a reselection interval Treselection. The MS considers a cell for reselection in a descending order of priority. As to cells of RATs having the same priority, the MS considers a cell for reselection in a descending order of S_non-serving_XXX. The MS reselects a first cell satisfying the criterion.

Second, S_GSM is lower than THRESH_GSM_low of the serving cell and all measured GSM cells during the Treselection. The MS considers inter-RAT reselection in the order described below, and reselects the first cell satisfying the following criteria.

(1) S_non-serving_XXX of one or more cells having a lower priority is greater than THRESH_XXX_low during the Treselection. The MS considers a cell for reselection in a descending order of priority. As to cells of RATs having the same priority, the MS considers a cell for reselection in a descending order of S_non-serving_XXX.

(2) If no cell satisfies the above criterion (1), an inter-RAT cell of which S_non-serving_XXX is greater than S_GSM by hysteresis H_PRIO is considered.

If the second priority information is not provided, the MS performs inter-RAT cell reselection based on cell ranking (step S340).

According to the proposed method, if the priority information of the serving cell is not provided, the MS performs cell reselection toward the different RAT based on the cell ranking.

Figure 4:
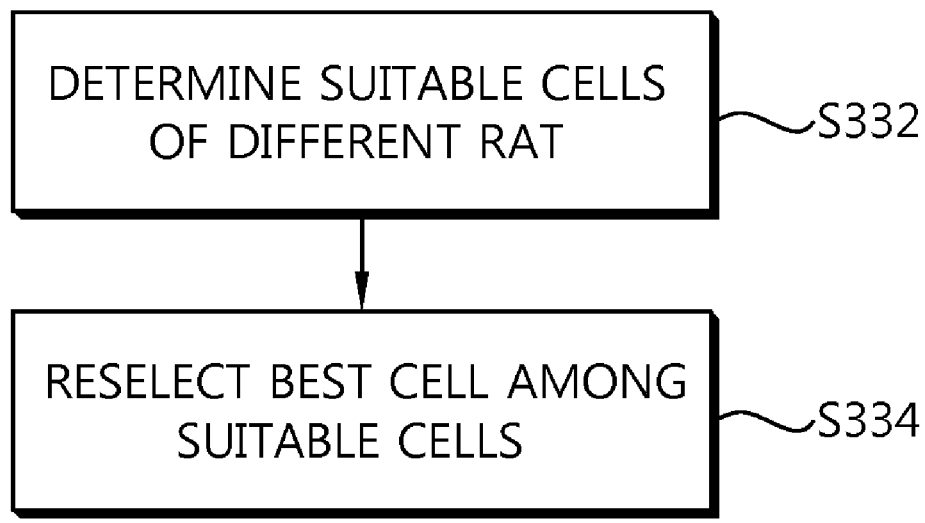
FIG. 4 is a flowchart showing cell reselection based on cell ranking.

FIG. 4 is a flowchart showing cell reselection based on cell ranking. This is a detailed description of the step S330 of FIG. 3.

An MS determines suitable cells to be reselected according to whether a measured value of cells of a different RAT satisfies a particular criterion (step S332). The measured value includes at least one of a received signal code power (RSCP) value, an Ec/No value, and a received level average (RLA_C) value. Regarding measurement of these values, the sections 6.6 and 8.1.5 of 3GPP TS 45.008 V9.1.0 (2009-11) may be incorporated herein by reference.

For a frequency division duplex (FDD) cell, the MS may determine this cell to the suitable cell if the following criteria are all satisfied for 5 seconds. (1) An RSCP value of the cell is greater than RLC_A of a serving cell and other non-serving GSM cells by a first offset. (2) An Ec/No value of the cell is greater than a particular value. (3) The RSCP value of the cell is greater than or equal to a particular threshold.

Alternatively, regarding a time division duplex (TDD) cell, the MS may determine this cell as the suitable cell if an RSCP value of the cell is greater than RLC_A by a second offset.

The first offset and the second offset may be reported by the serving cell to the MS. Information for determining the particular value or the particular threshold may be reported by the serving cell to the MS.

The MS performs cell reselection toward a cell having a greatest RSCP value among the suitable cells (step S334).

When the priority information of the serving cell is not provided, cell reselection is performed toward the best cell among cells of the different RAT without having to assign a lowest priority to the serving cell. Therefore, signal quality deterioration can be avoided, and battery consumption of the MS can be reduced.

Figure 5:
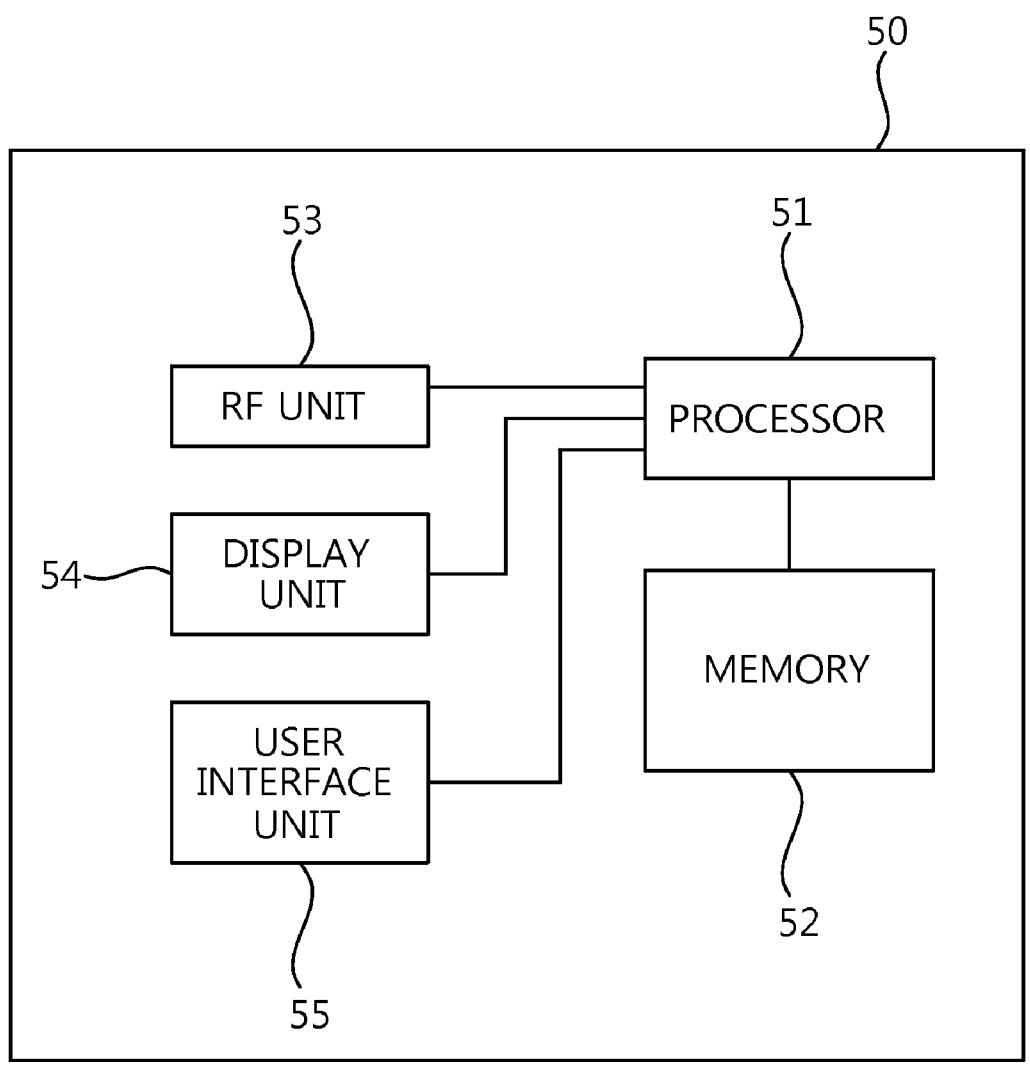
FIG. 5 is a block diagram showing a mobile station for implementing an embodiment of the present invention.

FIG. 5 is a block diagram showing an MS for implementing an embodiment of the present invention.

An MS 50 includes a processor 51, a memory 52, a radio frequency (RF) unit 53, a display unit 54, and a user interface unit 55.

By implementing layers of a radio interface protocol, the processor 51 implements a cell reselection method according to the embodiment of FIG. 3.

The memory 52 is coupled to the processor 51, and stores a variety of information for driving the processor 51.

The display unit 54 displays a variety of information of the MS, and may use well-known elements such as a liquid crystal display (LCD), an organic light emitting diode (OLED), etc.

The user interface unit 55 may be configured by combining well-known user interfaces such as a keypad, a touch screen, etc.

The RF unit 53 is coupled to the processor 51, and transmits and/or receives a radio signal.

A processor may include application-specific integrated circuit (ASIC), other chipset, logic circuit and/or data processing device. A memory may include read-only memory (ROM), random access memory (RAM), flash memory, memory card, storage medium and/or other storage device. A RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by the processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method of performing cell reselection by a mobile station which camps on a serving cell of a first radio access technology (RAT) in a wireless communication system, comprising:
   determining whether first priority information for the serving cell of the first RAT is provided by the serving cell;
   receiving, second priority information of a second RAT;
   if the first priority information for the serving cell of the first RAT is provided, performing inter-RAT cell reselection based on the first and second priority information; and
   if the first priority information for the serving cell of the first RAT is not provided, performing cell reselection toward the second RAT based on measured values of cells of the second RAT without considering the second priority information,
   wherein the first priority information includes a priority and a threshold for the serving cell of the first RAT used for inter-RAT cell reselection, and the second priority information includes a priority and thresholds of the second RAT used for inter-RAT cell reselection,
   wherein the step of performing cell reselection toward the second RAT based on measured values of cells of the second RAT includes:
   determining at least one suitable cell used for reselection from the first RAT to the second RAT, wherein a measured value of each of the at least one suitable cell of the second RAT exceeds a measured value of the serving cell by an offset during an interval; and
   reselecting a cell with the greatest measured value among the at least one suitable cell of the second RAT.

2. The method of claim 1, wherein the measured value of each of the at least one suitable cell of the second RAT includes a measured received signal code power (RSCP) value of the at least one suitable cell of the second RAT, and the measured value of the serving cell includes a received level averages of the serving cell.

3. The method of claim 1, wherein the first RAT includes GSM EDGE Radio Access Network (GERAN) and the second RAT includes UMTS Terrestrial Radio Access Network (UTRAN).

4. The method of claim 1, wherein if the first priority information for the serving cell of the first RAT is provided, the second priority information includes the first priority information.

5. A mobile station of performing cell reselection in a wireless communication system, wherein the mobile station camps on a serving cell of a first radio access technology (RAT), comprising:
   a radio frequency unit for transmitting and receiving radio signals; and
   a processor operatively coupled with the radio frequency unit and configured for:
   determining whether first priority information for the serving cell of the first RAT is provided by the serving cell;
   receiving, second priority information of a second RAT;
   if the first priority information for the serving cell of the first RAT is provided, performing inter-RAT cell reselection based on the first and second priority information; and
   if the first priority information for the serving cell of the first RAT is not provided, performing cell reselection toward the second RAT based on measured values of cells of the second RAT without considering the second priority information,
   wherein the first priority information includes a priority and a threshold for the serving cell of the first RAT used for inter-RAT cell reselection, and the second priority information includes a priority and thresholds of the second RAT used for inter-RAT cell reselection,
   wherein the processor is configured for performing cell reselection toward the second RAT based on measured values of cells of the second RAT by:
   determining at least one suitable cell used for reselection from the first RAT to the second RAT, wherein a measured value of each of the at least one suitable cell of the second RAT exceeds a measured value of the serving cell by an offset during an interval; and
   reselecting a cell with the greatest measured value among the at least one suitable cell of the second RAT.

6. The mobile station of claim 5, wherein the measured value of each of the at least one suitable cell of the second RAT includes a measured received signal code power (RSCP) value of the at least one suitable cell of the second RAT, and the measured value of the serving cell includes a received level averages of the serving cell.

7. The mobile station of claim 5, wherein the first RAT includes GSM EDGE Radio Access Network (GERAN) and the second RAT includes UMTS Terrestrial Radio Access Network (UTRAN).

8. The mobile station of claim 5, wherein if the first priority information for the serving cell of the first RAT is provided, the second priority information includes the first priority information.

* * * * *